United States Patent

Rochling et al.

[11] 3,920,684
[45] Nov. 18, 1975

[54] BENZIMIDAZOLE CARBAMATES

[75] Inventors: Hans Rochling, Altenhain, Taunus; Gerhard Horlein, Frankfurt am Main; Kurt Hartel, Hofheim, Taunus, all of Germany

[73] Assignee: Hoechst Aktiengesellschaft, Frankfurt am Main, Germany

[22] Filed: June 27, 1973

[21] Appl. No.: 374,116

[30] Foreign Application Priority Data
June 29, 1972 Germany............................ 2231883

[52] U.S. Cl........... 260/309.2; 424/273; 260/240 J; 71/92
[51] Int. Cl.²....................................... C07D 233/66
[58] Field of Search........ 260/309.2, 240 J; 424/273

[56] References Cited
UNITED STATES PATENTS

| | | | |
|---|---|---|---|
| 3,636,005 | 1/1972 | Klopping............................ | 260/309.2 |
| 3,658,812 | 4/1972 | Baker et al........................ | 260/240 J |

*Primary Examiner*—Henry R. Jiles
*Assistant Examiner*—C. M. S. Jaisle
*Attorney, Agent, or Firm*—Curtis, Morris & Safford

[57] ABSTRACT

Compounds of the formula

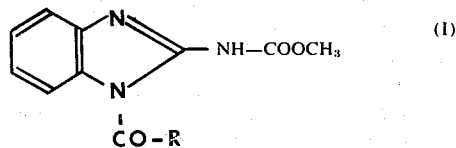

wherein R represents a) a group of the formula

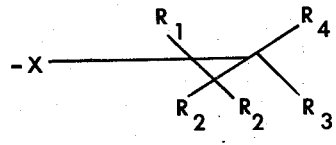

in which
X is a single chemical bond, a methylene group or a vinylene group ($-CH=CH-$);
$R_1$ is hydrogen or methyl,
$R_2$ is chlorine, bromine, methoxy, ethoxy, phenoxy, methyl-mercapto, ethylmercapto, phenylmercapto or di-($C_1$-$C_4$)-alkyl-amino,
$R_3$ is hydrogen or methyl,
$R_4$ is ($C_1$-$C_5$) alkyl or phenyl,
or b) the 2-dichloromethyl-cyclopent-3-enyl group

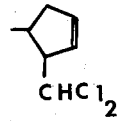

are valuable fungicides and anthelminthies.

2 Claims, No Drawings

BENZIMIDAZOLE CARBAMATES

The present invention comprises benzimidazoles having the formula

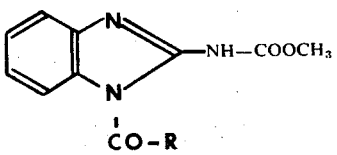

wherein R represents (a) a group of the formula

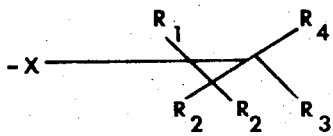

in which
X is a single chemical bond, a methylene group or a vinylene group (- CH = CH -);
$R_1$ is hydrogen or methyl,
$R_2$ is chlorine, bromine, methoxy, ethoxy, phenoxy, methyl-mercapto, ethylmercapto, phenylmercapto or di-($C_1$-$C_4$)-alkyl-amino,
$R_3$ is hydrogen or methyl,
$R_4$ is ($C_1$-$C_5$) alkyl or phenyl,
or b) the 2-dichloromethyl-cyclopent-3-enyl group

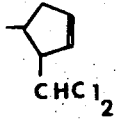

Another object of the present invention is a process for preparing compounds of the formula I, which comprises reacting 2-methoxycarbonylamino-benzimidazole of the formula

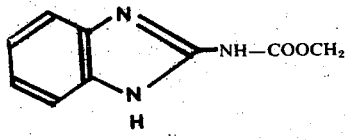

together with a carboxylic acid halide having the formula

Hal-CO-R (III)

in the presence of a basic condensating agent. The chlorides and bromides are preferably considered as halides.

A preferred embodiment of the process consists in suspending or dissolving in a solvent 2-methoxy-carbonylamino-benzimidazole (II), adding the molar to one and a half times the molar quantity of the acid halide and adding dropwise while stirring the molar to one and a half times the molar quantity of a tertiary organic base.

Preferred temperatures are of from 0° – 80°C, especially from 20° – 40°C, though the temperature range is not critical. The reaction product is normally dissolved. The hydrohalide of the tertiary organic base, being formed in course of the reaction, may be eliminated by shaking the reaction mixture with icewater and filtering off the residue.

The acylated benzimidazole may be isolated in pure form by precipitation with gasoline or by concentrating the reaction solution and treating the residue with an inert solvent such as gasoline, or by dissolving and reprecipitating e.g. from a carbon tetrachloride/gasoline mixture.

Besides the acid chlorides specified in the examples, e.g. the following cyclopropane-carboxylic acid-chlorides are suitable, too:

β-(2,2-dichloro-3-methyl-cyclopropyl)-acrylic acid-chloride,
β-(2,2-dimethoxy-3-methyl-cyclopropyl)-acrylic acid-chloride,
β-(2,2-diethoxy-3-methyl-cyclopropyl)-acrylic acid-chloride,
β-(2,2-diethylmercapto-3-methyl-cyclopropyl)-acrylic acid-chloride,
β-(2,2-diphenoxy-3-methyl-cyclopropyl)-acrylic acid-chloride,
1-methyl-2,2-dichloro-cyclopropane-carbonylchloride,
1-methyl-2,2-dimethoxy-3,3-dimethyl-cyclopropane-carbonylchloride,
1-methyl-2,2-diethoxy-3,3-dimethyl-cyclopropane-carbonylchloride,
2,2-dimethoxy-3-methyl-3-tert.-butylmethyl-cyclopropanecarbonyl-chloride,
2,2-diethoxy-3-methyl-3-tert.-butylmethyl-cyclopropanecarbonyl-chloride,
2,2-diphenoxy-3-methyl-3-tert.-butylmethyl-cyclopropanecarbonyl-chloride,
2,2-di-ethylmercypto-3-methyl-3-tert.-butylmethyl-cyclopropane-carbonylchloride,
2,2-dichloro-3-methyl-cyclopropane-carbonylchloride,
2,2-dimethoxy-3-methyl-cyclopropane-carbonylchloride,
2,2-diethoxy-3-methyl-cyclopropane-carbonylchloride,
2,2-diphenoxy-3-methyl-cyclopropane-carbonylchloride,
2,2-diethylmercapto-3-methyl-cyclopropane-carbonylchloride,
2,2-diphenoxy-3,3-dimethyl-cyclopropane-carbonylchloride,
2,2-di-ethylmercapto-3,3-dimethyl-cyclopropane-carbonylchloride,
2,2-di-phenylmercapto-3,3-dimethyl-cyclopropane-carbonylchloride,
2,2-dibromine-3,3-dimethyl-cyclopropane-carbonylchloride,
2,2-dichloro-cyclopropylmethyl-carbonylchloride.

The carbonyl chlorides may as well be replaced by carbonylbromides.

Solvents particularly well suitable for the reaction are moderately or slightly polar solvents, especially those having low boiling points, such as methylene chloride, chloroform, carbon tetrachloride, benzene; moreover, ethers such as diethylether, diisopropylether and tetrahydrofurane; esters such as methyl acetate and ethyl acetate or ketones such as acetone or methyl-ethyl ketone. Preference is given to chloroform or methylene chloride.

The organic bases used for the reaction must neither react with the acid halide, i.e. must not have a mobile proton, nor must they form OH-ions in solution, which would cause cleavage of the reaction products.

Best suited are therefore tertiary organic bases such as pyridine or triethylamine, or alkali metal carbonates or alkaline earth metal carbonates and bicarbonates such as $Na_2CO_3$, $NaHCO_3$, $K_2CO_3$, $MgCO_3$, $CaCO_3$ or $NH_4HCO_3$.

The starting compound 2-methoxycarbonylamino-benzimidazole may be prepared according to the method described in Journal of the American Chemical Society 56, 144 (1934) by the reaction of o-phenylenediamine with S-methylisothiourea-dicarboxylic acid-dimethylester. The preparation of the 2,2-dichloro-cyclopropane carboxylic acid halides is performed by addition of dichlorocarbene to unsaturated carboxylic acid esters in analogy to Houben-Weyl "Methoden der organ. Chemie", vol. 4, part 3, pg. 161, subsequent saponification of the ester formed and conversion into the acid halides. Other radicals of the formula $R_2$ may be introduced into the three-membered ring by reaction of the corresponding alkali metal compounds of the formula $Na-R_2$ or $K-R_2$ with the 2,2-dichloro-cyclopropanecarboxylic acid ester formed in the first phase. 2-dichloromethyl-cyclopent-3-en-carbonyl chloride is prepared according to the description given in Journal of Chemical Society 1971, 1764.

The compounds of the present invention have valuable fungicidal and especially systemic properties, so that fungi having already penetrated into the plant tissue may be combated curatively by means of said compounds. This fact is especially important for fungus diseases having a long incubation period and which, once the infection has started, resist any treatment by usual fungicides. The efficiency range of these compounds is very broad and covers a series of important fungi causing diseases in crop farming, fruit-growing, viticulture, hop-culture, horticulture and ornamental plantsgrowing, some varieties of which may be cited in the following:

Fusicladium, Glocosporium, Cylindrosporium, Botrytis, Verticillium, Cercospora, Septoria, Mycospha-erella, Cladosporium, Colletotrichum, Rhizoctoria, Fusarium, Cercosporella, Ustilagineen, Erysiphaceen, Aspergillaceen, Sclerotinaceen.

The compounds as claimed may also be used for protecting stored fruit and vegetables against fungus infections (e.g. by fusarium, penicillium etc. varieties). Moreover, they are convenient for being applied in the technical field such as for the protection of textile material, wood, dyestuffs and coatings against rot-provoking or otherwise harmful fungi.

The fungicidal compositions contain as active agents the benzimidazoles of the general formula I, preferably in concentrations of from 2 – 95 percent in the usual mixtures with solid or liquid inert carrier material including adhesive agents, wetting agents, dispersants and/or grinding auxiliaries. They may be used as wettable powders, emulsions, suspensions, spraying agents or granules. They may as well be mixed with other fungicidal agents with which they form compatible mixtures.

As carrier material, mineral substances, for example aluminium silicates, argillaceous earths, kaolin, chalks, siliceous chalks, talcum, kieselguhr or hydrated silicic acids can be used, or preparations of these mineral substances with special additives, for example chalk with sodium stearate. As carrier material for liquid preparations, all usual and suitable solvents may be employed, for example toluene, xylene, diacetone alcohol, cyclohexanone, isophorone, gasolines, paraffin oils, dioxane, dimethyl formamide, dimethyl sulfoxide, ethyl acetate, tetrahydrofurane and chlorobenzene.

Suitable adhesives are glue-like cellulose products or polyvinyl alcohols.

As wetting agents, all suitable emulsifiers may be used, for example ethoxylated alkylphenols, salts of aryl- or alkyl-aryl-sulfonic acids, salts of ethoxylated phenyl sulfonic acids, and of oleyl methyl taurine or soaps.

Suitable dispersing agents are cellulose pitch (salts of lignin sulfonic acid), salts of naphthalenesulfonic acid or, of oleyl methyl taurine.

Suitable inorganic or organic salts, for example sodium sulfate, ammonium sulfate, sodium carbonate, sodium bicarbonate, sodium thiosulfate, sodium stearate, or sodium acetate may be used as grinding auxiliaries.

The products of the invention are suitable, moreover, to combat infectious parasite diseases, especially helmintic infections, of humans and warmblooded animals.

A particularly distinctive antihelmintic effect is obtained - combined with good compatibility - in case of gastro-intestinal strongyloides to which ruminants are particularly prone.

The noxious effect of these parasites in the animal can cause great economical losses. Therefore, the products according to the present invention are valuable medicines. In practice, the antihelmintics are administered either orally or subcutaneously; it depends on the circumstances, which of the two possibilities may be preferred. For oral use finished suspensions (of 1 – 50 percent, preferably 3 – 15 percent) concentration of active ingredient or in water suspandable powders (of 1 – 80 percent, preferably 40 – 70 percent), concentrated pastes and granules of different degrees of concentration are also suitable. Parenteral treatment is performed by means of sterile solutions of different concentration. For providing a good distribution, stabilisation and preservation and a better resorption of the active agent as well, formulation auxiliaries such as talcum, lactose, magnesium stearate, aerosil, starch or polyethyleneglycol are also added.

The following examples illustrate the invention.

A. PREPARATION EXAMPLES

EXAMPLE 1

19.1 g (0.1 mole) of 2-methoxycarbonylamino-benzimidazole were suspended in 180 ml of dried chloroform and 20.1 g (0.1 mole) of 2,2-dichloro-3,3-dimethyl-cyclopropane-carboxylic acid chloride were added. A solution of 10.1 g (0.1 mole) of triethylamine in 40 ml of dried chloroform was added dropwise to this mixture at a temperature below 38°C. The reaction mixture was stirred for 5 minutes at 35°C and then shaken thoroughly twice with 100 ml of icewater. The chloroform phase was filtered off dried over $MgSO_4$ and concentrated in vacuo at 35°C. The residue was dissolved in carbon tetrachloride and precipitated with n-hexane.

19.9 g of 1-(2′, 2′-dichloro-3′, 3′-dimethyl-cyclopropanecarbonyl)-2-methoxycarbonylamino-benzimidazole were obtained having a melting point of 145° – 146°C.

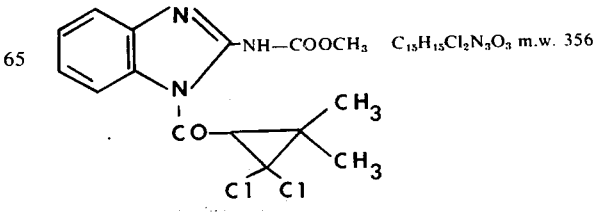

calc.: C 50.6 %; H 4.22 %; N 11.79 %
found : C 51.0 %; H 4.2 %; N 11.6 %

EXAMPLE 2

19.1 g (0.1 mole) of 2-methoxycarbonylamino-benzimidazole were suspended in 180 ml of dry chloroform and 23.46 g (0.11 mole) of 2-dichloromethyl-cyclopent-3-en-carboxylic acid chloride were added. This suspension was agitated while being heated to 35°C and at this temperature a solution of 11.1 g (0.11 mole) of triethylamine in 50 ml of dried chloroform was added dropwise.

The solution formed was stirred at 35°C for another 45 minutes, then allowed to cool down and shaken thoroughly twice with icewater. The organic phase was dried over MgSO$_4$ and concentrated in vacuo, at 35°C. The residue was triturated with n-hexane.

27.3 g of 1-(2'-dichloromethyl-cyclopent-3'-en-carbonyl)-2-methoxy-carbonylamino-benzimidazole were obtained having a melting point of 93°C.

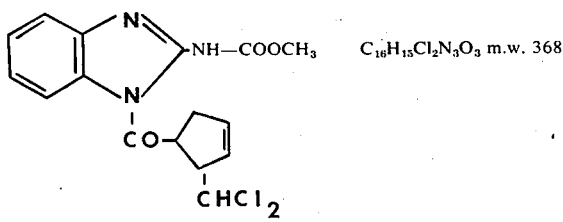

C$_{16}$H$_{15}$Cl$_2$N$_3$O$_3$ m.w. 368 calc.: C 52.2 %; H 4.08 %; N 11.40 %
found : C 51.6 %; H 4.10 %; N 11.10 %.

The substances specified in the following table having the formula

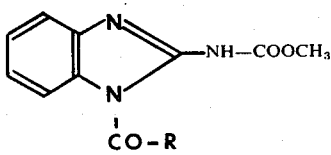

were prepared in analogy to the examples 1 to 2.

Table

| Example | R | Melting point °C |
|---|---|---|
| 3 | (cyclopropyl with Cl, Cl, phenyl) | 185 |
| 4 | (cyclopropyl with Cl, Cl, CH$_2$-C(CH$_3$)$_3$, CH$_3$) | 114–116 |
| 5 | (cyclopropyl with CH$_3$O, OCH$_3$, CH$_3$, CH$_3$) | 142 |
| 6 | (cyclopropyl with Cl, Cl, CH$_3$, CH$_3$, CH$_3$, CH$_3$) | 123–125 |
| 7 | (cyclopropyl with H$_5$C$_2$O, OC$_2$H$_5$, CH$_3$, CH$_3$) | 110 |

B. APPLICATION EXAMPLES

EXAMPLE I

Cucumber plants were sultivated in pots and after having developed two leaves each, the plants were dripsprayed with solutions of the compounds according to examples 1,5,7,4,3 and 2.

The concentrations applied amounted to 2000, 1000, 500, 250, 125 and 60 mg of active substance per liter of spray liquor. As comparative agent benomyl (1-butyl-carbamoyl-2-methoxycarbonylamino-benzimidazole) in the same concentrations was used.

After drying the plants were placed in a greenhouse and left there until the four leaf stage. The plants were then heavily infested with conidia of cucumber mildew (Irysiphe cichloracearum) and the greenhouse was brought to optimum conditions for mildew infection, i.e. to temperatures of 22° – 23°C and a relative atmospheric humidity of 80 – 90 percent. After an incubation period of 14 days the plants were examined in respect to the degree of their cucumber mildew infection. The evaluation of the infection was carried out visually. The infection degree is expressed in table I in percent of infested leaf area as compared with untreated infested control plants.

As the results of the test show the compounds of the present invention have an excellent systemic effect against genuine fungoid mildew which is better than that of the comparative agent.

EXAMPLE II

Winter rye of the variety "Pettkuser Kurzstroh" which had been heavily infested naturally by snow mould (Fusarium nivale) was mixed with the compounds specified in example I and with benomyl and shaken thoroughly for 10 minutes in a mechanical shaker. The application concentrations amounted to 20, 10, 5, 2.5, 1.25 and 0.6 g of active agent / 100 kg of seed.

After an exposure period of 24 hours 50 grains each of the treated seed were placed in 4 repititions in earthfilled cases and brought to sprouting in a cool green house at a temperature of from 8° – 10°C and a relative atmospheric humidity of 95 – 98 percent. After a 6 weeks period the germinated seed and the non-germinated as well were examined for their infection by snow mould.

As the test results of table II show, the compounds claimed by the present invention gave better protection against snow mould infection to the sprouting rye than the comparative agent. The untreated control plants show a very heavy infection by snow mould.

EXAMPLE III

Cotton seed was treated in a drum for 10 minutes with the compounds specified in example I and with benomyl as comparative agent at application concentrations of 200, 100, 50, 25, 12.5 and 6.75 g of active agent / 100 kg of seed. After an exposure period of 24 hours the seed was placed - in 5 repititions of 20 seed grains each - in earth heavily preinfested by Rhizoctonia solani, and allowed to germinate there in a greenhouse.

Four weeks after the seed started germinating, the plants were counted and examined for their infection by Rhizoctonia.

As the test result of table III shows, the compounds according to the present invention gabe better protection than the comparative agent to the seed against Rhizoctonia infection. An examination of the untreated control seed showed that all the grains resp. all the germinating seeds placed in infested earth were killed by Rhizoctonia.

EXAMPLE IV

Apple seedlings were heavily infested by conidia of black spot (Fusicladium dentriticum) upon having developed 4 leaves and then placed in a moisture chamber having a relative atmospheric humidity of 100 percent, at a temperature of 20°C. Two days later, the infested plants were transferred to a greenhouse kept at a temperature of 18°C and an atmospheric humidity of from 90 – 95 percent.

After an infection period of 5 days, which allowed the fully developed conidia to penetrate into the plants and to spread there, the plants were drip-sprayed with the compounds specified in example I and with the comparative agent benomyl as well, at concentrations of 30, 15, 7.5, 3.75, 1.9 and 0.95 mg of active substance per liter of spray liquor.

After drying the plants were transferred back to the greenhouse. After an incubation period of 21 days, the plants were examined for infection by black spot; table IV indicates the degree of infection, expressed in percent of infested leaf area relative to untreated infested control plants.

As the results show, the compounds according to the present invention have an excellent systemic action and a better curative effect than the comparative agent.

EXAMPLE V

Sugar beet plants in the 6-leaf-stage were heavily infested with conidia of beet leaf spot (Cercospora beticola) and, subsequently, placed dripping wet in a moisture chamber being kept at a temperature of 25°C and a relative atmospheric humidity of 100 percent for 24 hours. The plants were then transferred to a greenhouse having a temperature of 25° – 26°C and a relative atmospheric humidity of 85 – 90 percent. After an infection period of 6 days, while the hose-like germs penetrated into the plant tissue and could spread there, the plants were sprayed to dripping wetness with the compounds specified in example I and benomyl as well as comparative agent, concentrated at 120, 60, 30, 15, 7.5 and 3.75 mg of active substance/1tr. of spray liquor.

After drying of the spray layer, the plants were transferred back to the greenhouse. At the end of an incubation period of 21 days, the plants were examined for their infection by the best leaf spot disease, the results are shown in table V, expressed in percent of infested leaf area relative to untreated infested plants.

As the infection degree shows, according to the specifications given in table V, the compounds of the present invention have an excellent curative effect due to their systemic properties, which are better than those of the comparative agent.

TABLE I

| Compound according to Example | % Infection by cucumber mildew at mg of active agent/1 of spray liquor | | | | | |
|---|---|---|---|---|---|---|
| | 2000 | 1000 | 500 | 250 | 125 | 60 |
| 1 | 0 | 0 | 5 | 8 | 13 | 24 |
| 5 | 0 | 0 | 0 | 5 | 10 | 18 |
| 7 | 0 | 0 | 0 | 3 | 8 | 15 |
| 4 | 0 | 3 | 8 | 15 | 24 | 28 |
| 3 | 0 | 0 | 0 | 5 | 12 | 20 |
| 2 | 0 | 5 | 8 | 15 | 24 | 26 |
| Comparative agent Benomyl | 0 | 6 | 10 | 17 | 25 | 31 |
| untreated infested control plants | 100 | 100 | 100 | 100 | 100 | 100 |

TABLE II

| Compound according to Example | % of infection of rye by snow mould at mg of active agent/100 kg of seed | | | | | |
|---|---|---|---|---|---|---|
| | 20 | 10 | 5 | 2,5 | 1,25 | 0,6 |
| 1 | 0 | 0 | 0 | 5 | 10 | 25 |
| 5 | 0 | 0 | 0 | 8 | 12 | 26 |
| 7 | 0 | 0 | 0 | 5 | 10 | 24 |
| 4 | 0 | 1 | 5 | 10 | 18 | 28 |
| 3 | 0 | 0 | 5 | 10 | 15 | 24 |
| 2 | 0 | 0 | 3 | 12 | 18 | 27 |
| Comparative agent Benomyl | 0 | 3 | 8 | 16 | 21 | 35 |
| untreated infested rye seed | 51 | 60 | 58 | 56 | 63 | 54 |

TABLE III

| Compound according to Example | % of infection by rhizoctonia at g of active agent/100kg of seed | | | | | |
|---|---|---|---|---|---|---|
| | 200 | 100 | 50 | 25 | 12,5 | 6,25 |
| 1 | 0 | 0 | 0 | 3 | 8 | 24 |
| 5 | 0 | 0 | 0 | 5 | 12 | 25 |
| 7 | 0 | 0 | 0 | 3 | 10 | 22 |
| 4 | 0 | 0 | 5 | 8 | 15 | 30 |
| 3 | 0 | 0 | 0 | 3 | 7 | 20 |
| 2 | 0 | 0 | 3 | 8 | 14 | 28 |
| Comparative agent Benomyl | 0 | 0 | 8 | 12 | 20 | 34 |
| untreated cotton seeds placed in infested earth | 100 | 100 | 100 | 100 | 100 | 100 |

TABLE IV

| Compound according to Example | % of infection by black spot at mg of active agent/l of spray liquor | | | | | |
|---|---|---|---|---|---|---|
| | 30 | 15 | 7,5 | 3,75 | 1,9 | 0,95 |
| 1 | 0 | 0 | 0 | 5 | 10 | 18 |
| 5 | 0 | 0 | 0 | 5 | 8 | 18 |
| 7 | 0 | 0 | 0 | 3 | 8 | 15 |
| 4 | 0 | 0 | 5 | 8 | 12 | 25 |
| 3 | 0 | 0 | 0 | 5 | 7 | 19 |
| 2 | 0 | 0 | 3 | 8 | 15 | 24 |
| Comparative agent Benomyl | 0 | 2 | 8 | 10 | 20 | 31 |
| untreated infested control plants | 100 | 100 | 100 | 100 | 100 | 100 |

TABLE V

| Compound according to Example | % of infection by beet leaf spot at mg of active agent/ltr. of spray liquor | | | | | |
|---|---|---|---|---|---|---|
| | 120 | 60 | 30 | 15 | 7,5 | 3,75 |
| 1 | 0 | 0 | 0 | 3 | 8 | 20 |
| 5 | 0 | 0 | 0 | 5 | 8 | 18 |
| 7 | 0 | 0 | 0 | 3 | 6 | 20 |
| 4 | 0 | 0 | 5 | 10 | 20 | 28 |
| 3 | 0 | 0 | 0 | 3 | 8 | 19 |
| 2 | 0 | 0 | 3 | 12 | 18 | 25 |
| Comparative agent Benomyl | 0 | 0 | 8 | 17 | 25 | 38 |
| untreated infested control plants | 100 | 100 | 100 | 100 | 100 | 100 |

We claim:

1. A benzimidazole having the formula

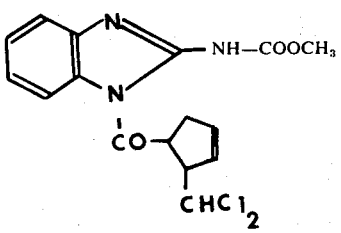

2. A benzimidazole having the formula

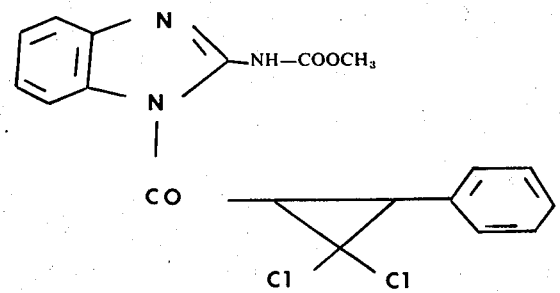

* * * * *